TELEPHONE DIRECTORY COVER AND HOLDER

Filed March 24, 1965 3 Sheets-Sheet 1

INVENTORS
W. N. CALDWELL
J. W. ERICSSON
R. E. PRESCOTT
W. E. WHIDDEN
BY Edwin B. Cave
ATTORNEY

TELEPHONE DIRECTORY COVER AND HOLDER

Filed March 24, 1965 3 Sheets-Sheet 2

Sept. 27, 1966 W. N. CALDWELL ETAL 3,275,279

TELEPHONE DIRECTORY COVER AND HOLDER

Filed March 24, 1965 3 Sheets-Sheet 3

United States Patent Office 3,275,279

Patented Sept. 27, 1966

3,275,279

TELEPHONE DIRECTORY COVER AND HOLDER

William N. Caldwell, Hazlet, N.J., James W. Ericsson, Indianapolis, Ind., and Robert E. Prescott, Rumson, and William E. Whidden, Red Bank, N.J., assignors to Bell Telephone Laboratories, Incorporated, New York, N.Y., a corporation of New York Filed Mar. 24, 1965, Ser. No. 442,257

15 Claims. (Cl. 248—447)

This invention relates to book holder and storage apparatus, particularly in connection with telephone directories for use with outdoor public telephone installations. The general object of the invention is to improve the directory service essential to all public telephones.

In recent years a marked trend has developed in telephone booth structure characterized by an increased accessibility of the telephones and directories, especially in booths intended for outdoor walk-up use. Many such booths entail little more in structure than a canopy, a shelf and a pair of baffles, defining in aggregate a telephoning recess. The ease of accessibility that is the primary intended advantage of such design is, however, accompanied and in most instances significantly offset by the necessarily increased exposure of the telephone directories to human traffic and, particularly, to weather extremes. The problem of protecting the directories adequately without concurrently reducing their ease of use and also encroaching upon the severely limited shelf and elbow space in such installations has persisted notwithstanding notable approaches such as disclosed, for example, in Patent 2,494,382, issued to H. R. Faulkner et al. on January 10, 1950.

One specific directory storage and display problem encountered in the ready-access booth type involves protecting the book from moisture damage. Covers which hold and substantially enclose the entire directory and are themselves connected to retractable apparatus, such as disclosed in the patent cited above or in Patent 3,028,701, issued to R. H. Popper on April 10, 1962, simplify and encourage the return of the directory to a protective storage space located, for example, beneath a service shelf. Needed, however, are means to ensure the automatic return of the directory and holder to storage when, as often happens, the user is not predisposed to do so himself.

Also needed are means not dependent on the user or on complex mechanisms for ensuring complete and continuing closure of the covers, once in storage, to seal out moisture. A failing of all but the most complicated known telephone directory protective covers is that, due to hinge stiffness and dimensional differences in the cover, the halves do not make close contact. Consequently, rain and dust readily enter through the resultant wedge-shaped opening.

A further problem relating to directory accessibility, and bearing also on the matter of protective storage, involves the positioning of the book into an optimum reading attitude with the least possible effort, and its subsequent return to storage. Since most people prefer a reading vantage point from which the pages are perpendicular to the line of slight, a telephone directory withdrawn for reading should assume and maintain an appreciable angle to the horizontal. A directory which can easily be brought, in a well-protected manner, to an optimum reading position such as described, and manipulated there with just one hand is an obvious convenience to most people and also avoids considerable directory wear.

Additionally, known retractable-type holders require a conscious, positive act by the directory user to return the book, or at least initiate the return thereof, from a reading position to a remote storage position. As noted, this act is frequently omitted, leaving the directory exposed. Repeated such exposures cause rapid deterioration of the directory and an early, more costly replacement.

Accordingly, an object of the invention is to improve the protection for telephone directories installed in relatively exposed areas.

Another object of the invention is to increase the accessibility and ease of use of telephone directories installed in protective retractable covers.

A further object of the invention is to achieve a longer life expectancy for telephone directories thereby to reduce the annual directory replacement costs.

These and other objects are realized in accordance with the principles of the invention, broadly, through a unique cooperation between retractable holding apparatus and a full-closure directory cover, by which the directory normally rests remotely suspended beneath a service shelf, withdraws manually to an inclined reading position at the shelf's edge where a slight finger pressure will maintain it, and on release returns automatically to the remote position, the cover achieving initial closure by its own weight, and finally, sealed closure around at least one exposed directory edge by magnetic attraction of the cover halves.

In one illustrative embodiment of the invention the directory is vertically suspended by its binding below a booth shelf. A carriage including four rollers is guidably mounted in a pair of channels which are affixed on an incline to a rail bracket on the underside of the shelf, and are advantageously perpendicular to the forward edge thereof. A holder pivotally slung from the carriage bottom supports the binding edge of a protective cover in a normally horizontal position. The cover is formed in one piece from polypropylene or the like, is self-hinged, and encloses the directory at least around its forward exposed edge. Fastened to the opposed forward edges of the directory cover are strips of flexible magnetic material such as barium ferrite rubber to effect a complete closure of the cover's front end, even though the opposing edges may be slightly misaligned. This magnetic seal allows considerable misalignment of the cover halves in a vertical shear displacement without diminishing the weathertight seal. Additionally, sufficient magnetic force at the seal is present to keep the halves closed even in high winds. At the bottom of the cover's front end is molded a handle for withdrawing the directory and its holding apparatus.

To acquire the directory, a user pulls the handle and the carriage travels forward to a stop at the end of the channel. The cover is pivoted upwardly until its binding edge abuts the edge of the shelf. In this position, the front and back portions of the cover are easily separated and the directory opened for reading, inclined toward the user, and maintained there by a slight pressure. The user may thereafter close the covers and return the directory and holder to the remote storage position. If he omits this, the assemblage of its own weight will return to storage. The cover will pivot back until its binding edge is again horizontal, whereupon the magnetic closure of the forward cover ends will occur and the carriage will roll back to the far end of the track.

Accordingly, a feature of the invention resides in a telephone directory holder that restores itself from an optimum reading position atop an unbroken shelf to a remote storage location beneath the shelf.

Another feature of the invention relates to a one-piece flexible protective cover enclosing a telephone directory at its exposed edges with opposed, magnetically attracted flanges which need not be aligned precisely to achieve the full protective closure.

These and other features of the invention are particularized more fully in the following detailed description of one illustrative embodiment thereof and in the drawing in which.

Figures 1, 2A, 2B, 2C:
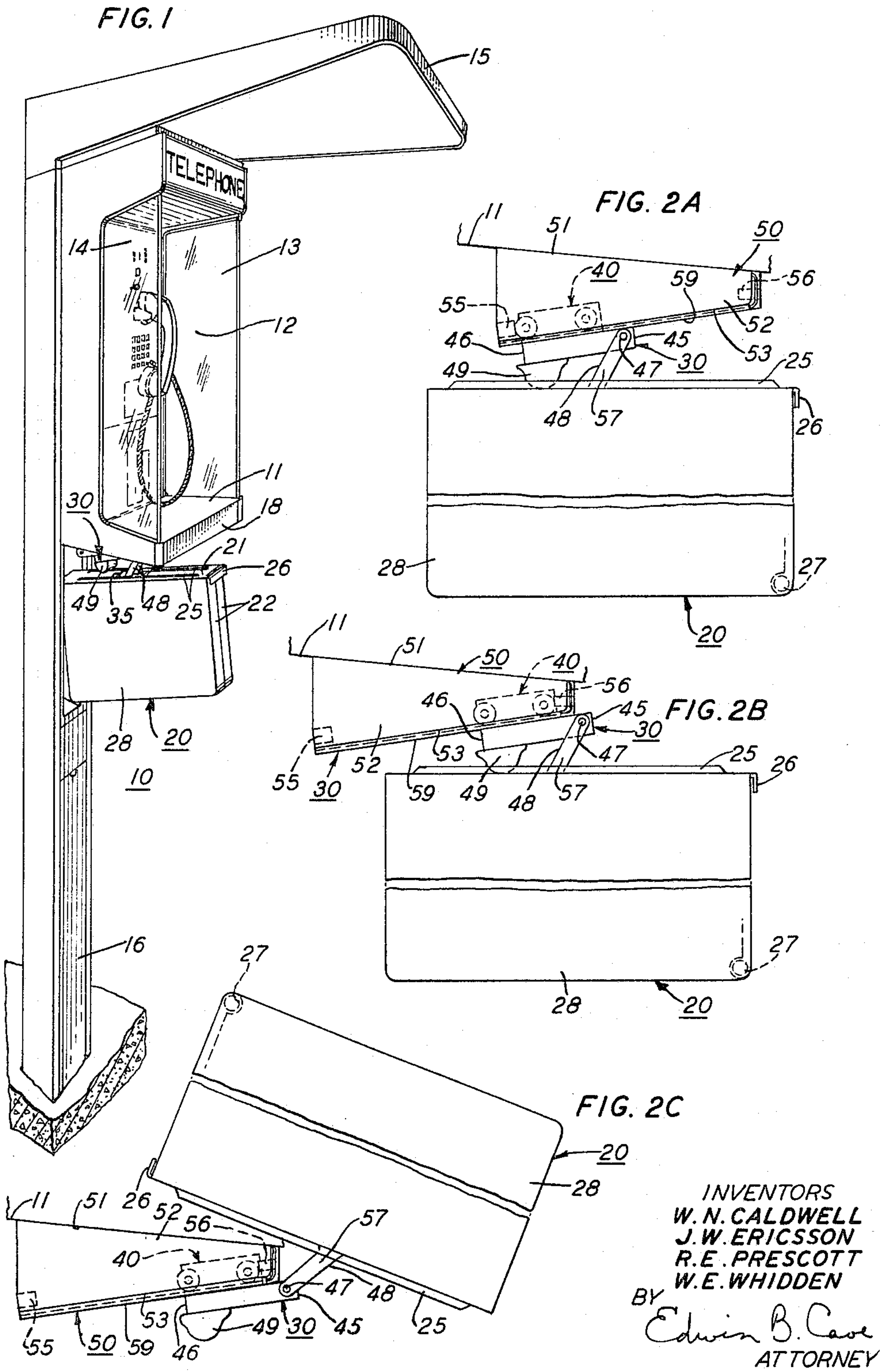
FIG. 1 shows the holder installed in a walkup telephoning structure.
FIG. 2A is a side schematic view showing the holder and carriage in stored position.
FIG. 2B is a side schematic view showing the carriage in its forward position.
FIG. 2C is a side schematic view showing the directory cover in its pivoted reading position.

Referring first to FIG. 1, a walkup telephone booth designated generally as 10 includes a service shelf 11 and a relatively exposed telephoning area 12 formed of side panels 13 and 14 and a roof canopy 15. This structure is supported on a single post 16 and is typically exposed to outdoor weather conditions and considerable human traffic. Further detail concerning this structure is found in the copending application of James W. Ericsson-Robert E. Prescott, Serial No. 421,866.

Mounted beneath shelf 11 is a telephone directory 17 (FIG. 4B) protected by a directory cover 20 and held, in a manner to be described, by a directory holder 30 such as in FIG. 2A. Directory holder 30 consists of a carriage assembly 40 mounted in a bracket assembly 50.

Figure 2D:
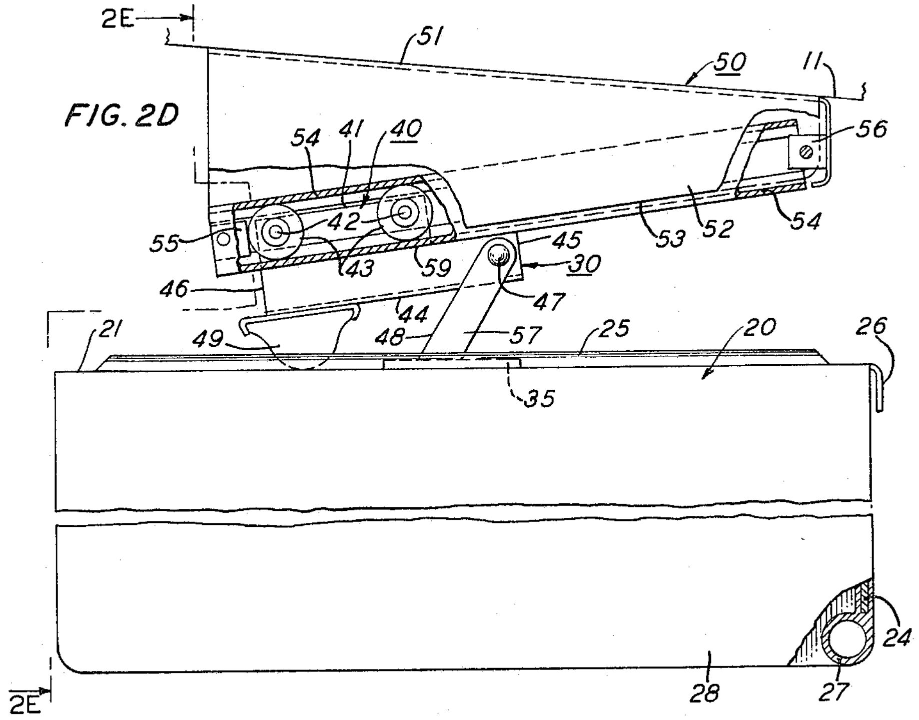
FIG. 2D is a side view in partial section showing the carriage and cover structure.

In FIGS. 2A through 2E is shown assembly 50 which consists of a channel 51 mounted on the underside of shelf 11 perpendicular to the forward edge 18 of shelf 11, by any convenient fashion. As seen in FIGS. 2A and 2D, channel 51 includes two tapered legs 52 each having a lower edge 53. On each lower edge 53 is mounted a rail 54, each of which serves as a track for carriage 40. Each rail 54 has a rear stop 55 and a forward stop 56 which limit the movement of carriage 40.

Figure 2E:
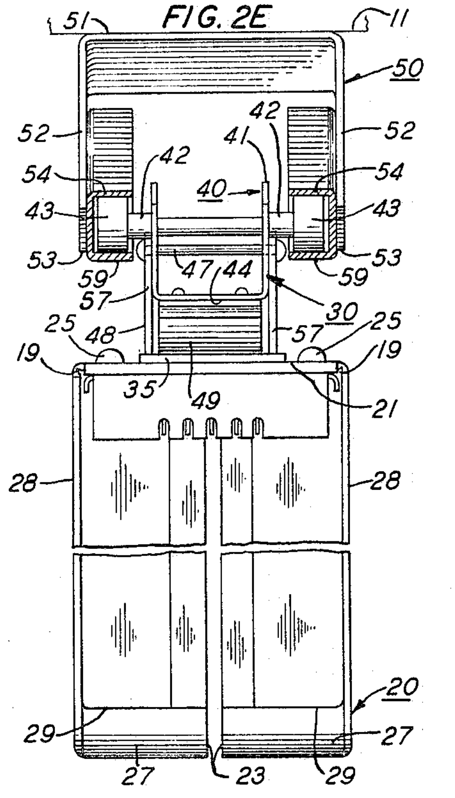
FIG. 2E is a front view in partial section showing the carriage and cover structure.

As best seen in FIGS. 2D and 2E, carriage 40 consists of a housing 41, two axles 42 mounted on housing 41 and two rollers 43 on each axle. These rollers, preferably of nylon, travel along lower legs 59 of rails 54. Housing 41 includes an under portion 44 with first and second ends 45 and 46, respectively. Pivotally mounted at end 45 by pin 47 is angle 48 which supports directory cover 20 at the binding edge 21 thereof so that when in storage edge 21 is essentially horizontal. Raised beads 25 are molded or otherwise fastened laterally along edge 21 for contact with shelf 11 thereby to localize wear. A raised section 35 extends perpendicularly from edge 21 to protect mounting hardware 57 and prevent moisture from entering through the directory cover at this point. A bumper 49 attached at end 46 cushions the return movement of cover 20 and directory 17 as will be described, and helps maintain it in the mentioned horizontal position when in storage as shown in FIG. 2A.

Figure 3:
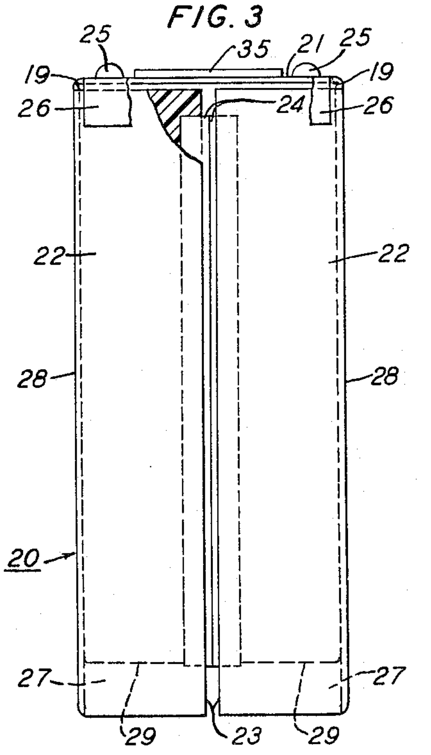
FIG. 3 is a front view in partial section showing closure of the magnetic strips.

As shown in FIG. 3, cover 20 is advantageously molded of a flexible waterproof material such as polypropylene in one continuous piece, so that its two sides 28 are joined to edge 21 along two waterproof hinge portions 19. Integral with each of the sides 28, and along the front edge of cover 20 are flanges 22 which oppose each other along meeting edges 23. To each edge 23 is fastened a magnetic strip 24 preferably composed of a flexible magnetic material such as barium ferrite rubber. During closure of cover 20, as flanges 22 converge, strips 24 attract each other thereby to effect a substantially watertight seal of flanges 22 on full closure. The seal is achieved despite any minor misalignment of edges 23 because the strips 24 will abut tightly as long as any portion of their mating surfaces are in contact.

Each side 28 extends beyond the bottom edge 29 of directory 17, as illustrated in FIGS. 2E and 3. Gripping members 27 molded into the lower edges of flanges 22, as shown in FIG. 2D, serve as a convenient handle.

A lip 26 is fastened to the exposed end of edge 21, as seen in FIG. 2D, to allow accumulations of moisture to discharge well away from the mating edges 23 of cover 20. Cover 20 is left open at the bottom and rear primarily to enable the directory to dry out after a prolonged period of high humidity. This also eliminates the objectionable turned-up cover edges which in the reading position interfere with a customer rapidly thumbing through the directory.

As seen in FIG. 1, shelf 11 is a smooth surface, unbroken by slots or other provisions for mounting the directory such as are found in some prior art. A plurality of directory holders may, of course, be mounted beneath shelf 11, if desired. Moreover, holder 30 need not be mounted centrally as shown in FIG. 1 but may be mounted to one side or at right angles to either of side panels 13 and 14, for example, to allow for more of shelf 11 as a writing surface when the directory is in use.

When not in use, directory holder 30 is at rest against stop 55 in its protective, stored position. The exposed or top edge 30 of directory 17, seen in FIG. 4B, is protected in accordance with the invention by the closed flanges 22 as noted above. The bottom end 32 of directory 17, that is, the end opposite the binding, may, of course, be covered with flanges such as the flanges 22 which cover the directory edge 31; but in most instances are not necessary because of the other protective features provided in accordance with the invention as already noted.

A person wishing to use the directory grasps handle 27 and pulls forward until carriage 40 travels to forward stop 56 as in FIG. 2B. At this point, cover 20 with angle 48 is pivoted upwardly around pin 47 until the bumper 25 comes to rest against edge 18 of shelf 11, as shown in FIG. 2C. In this position, directory 17 would tend to fall open of its own accord, were it not for the continued attraction of flanges 22 for each other which keep cover 20 closed. In accordance with the invention, this tendency is utilized to reduce to a minimum the force needed to separate the flanges 22 to expose the directory.

Figure 4A:
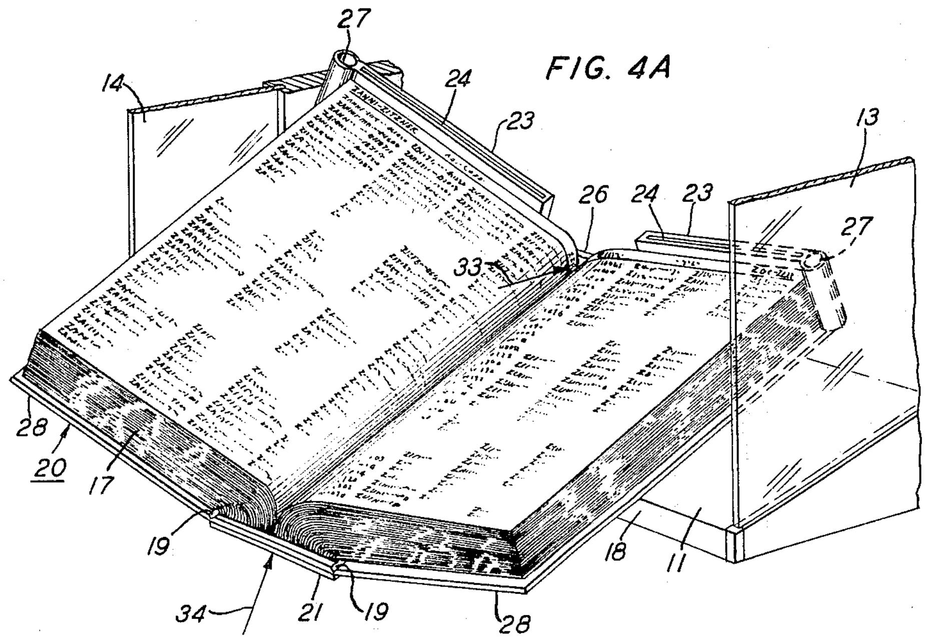
FIG. 4A is a perspective view showing the cover in its open position.
Figure 4B:
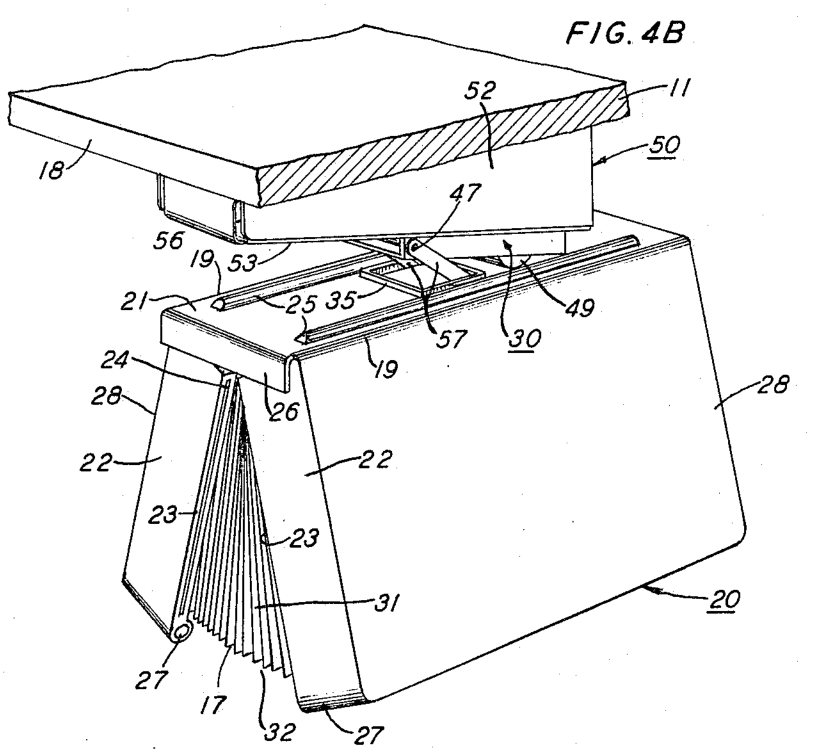
FIG. 4B is a perspective view showing the cover closing and the carriage returning to its stored position.

As seen in FIG. 4A, the open directory is inclined toward the reader at an angle to shelf 11. A slight pressure applied either in accordance with arrow 33 or arrow 34 will maintain it thus. In accordance with the inventive principles, it is possible for the user to perform with one hand not only the withdrawing and pivoting operation, but the opening of cover 20 and the turning of pages also. The advantages thus realizable to a person having only one free hand are apparent.

When released, the directory and cover will pivot downwardly about pin 47. As soon as binding edge 21 passes a vertical position the directory cover sides 28 commence their closure. By the time that edge 21 has returned to the horizontal, as illustrated in FIG. 4B, the strips 24 of flanges 22 have begun to contact, and shortly thereafter effect the moisture-tight seal that is a feature of the invention. During this process, the carriage 40 rolls back to stop 55, returning the directory to its stored position.

Various changes and modifications may be made to the telephone directory holder and cover as illustrated in the described embodiment without departing from the spirit and scope of the invention.

What is claimed is:

1. In a telephone directory cover composed of a relatively flexible material and including a binding edge, two sides and opposed flanges for protectively enclosing exposed edges of a directory, the improvement comprising, a pair of continuous, flexible magnetic strips attached along the respective meeting edges of said opposed flanges whereby on closure of said sides, said strips abut one another in a continuous, weatherproof seal regardless of minor misalignments of said opposed flanges.

2. In a telephone directory holder including retractable means for storing a directory in a recess, for guidably withdrawing same to a reading position and for returning same on release thereof to said recess, a protective directory cover comprising, in combination:

a one-piece continuous molding of polypropylene or the like, including a binding edge, a pair of sides and a pair of opposed flanges for enclosing an exposed edge of said directory, each said flange being attached to a respective one of said sides, and said binding edge being secured to said retractable means;

a pair of narrow, continuous, parallel portions of reduced cross section, each defining a boundary between said binding edge and a respective one of said sides and each serving as a flexible self-hinge for said cover; and a pair of flexible, magnetic strips attached to respective mating edges of said opposed flanges for automatically effecting a continuous sealing thereof upon release of said cover from said reading position and return thereof to said recess, regardless of minor misalignment of said opposed flanges.

3. In a telephone directory holder or the like including retractable means for storing a directory in a recess, for guidably withdrawing same to a reading position and for returning same on release thereof to said recess, a directory cover comprising, in combination:

a one-piece molding of polypropylene or the like, including a binding edge, a pair of sides and a pair of opposed flanges for enclosing an exposed edge of said directory, each said flange being attached to a respective one of said sides, and said binding edge being pivotally secured to said retractable means in a normally horizontal position;

a pair of narrow, continuous, parallel portions of reduced cross section, each defining a boundary between said binding edge and a respective one of said sides and each providing a flexible, self-hinge for said cover; and a pair of flexible magnetic strips composed of barium ferrite rubber or the like attached to respective mating edges of said opposed flanges, whereby upon release of said cover from said reading position, said sides close toward one another along said self-hinges and said magnetic strips are mutually attracted thereby to effect an unbroken closure of said opposed flanges despite minor misalignment of said flanges.

4. A telephone directory holder in accordance with claim 3 wherein said sides and said flanges of said directory cover extend substantially below the lowermost edge of said directory thereby to lend better protection to said edge and further to afford an inlet for air to reach said directory to facilitate its drying out after prolonged periods of high humidity.

5. A telephone directory holder in accordance with claim 4 wherein said extended portions of each said flange are curled inwardly at the bottoms to form a handle with which to grasp said directory for withdrawal thereof from said recess.

6. A telephone directory holder in accordance with claim 5 wherein said directory cover further includes a lip extending from said binding edge out over said opposed flanges thereby to direct moisture accumulations away from said closure.

7. In holding apparatus for a bound volume of relatively bulky printed matter, in combination, means for storing said volume beneath a shelf and for guidably withdrawing same to a reading position upon said shelf; and a cover containing said volume mounted on said means, said cover comprising a pair of opposed mutually attracted flanges for achieving a weatherproof seal around at least one exposed edge of said volume; whereby on release from said reading position, said volume is automatically returned to its stored position and concurrently said cover automatically closes thereby bringing said flanges together whereupon their mutual attraction effects a sealed closure around said exposed edge.

8. In holding apparatus for a bound volume of relatively bulky printed matter, in combination, means for storing said volume beneath a shelf and for guidably withdrawing said volume to a reading position at a forward edge of said shelf where, when opened, said volume rests at a substantial angle to the horizontal with the pages thereof substantially perpendicular to a user's line of vision; and a cover mounted on said means, said cover comprising a pair of opposed mutually attracted flanges for achieving a protective closure around at least one exposed edge of said volume, whereby when said volume is released from said reading position, said means returns said volume to beneath said shelf and said cover commences closure thereby bringing said flanges together whereupon their mutual attraction effects a tight final closure.

9. A telephone directory holder comprising, in combination, means for suspending a directory beneath a shelf whereby the forward edge of said directory is relatively exposed, and for guidably withdrawing said directory to a reading position upon said shelf where when opened said directory is inclined toward the user and at an angle to said shelf; a protective cover for mounting said directory and for enclosing said exposed forward edge, comprising a pair of opposed flanges and a strip of flexible magnetic material secured along each opposing edge of said flanges, whereby when said directory is released from said reading position, said means returns said directory to said suspended position beneath said shelf and said cover closes thereby bringing said opposed flanges together whereupon the magnetic attraction of said strips effects a continuous tight closure of said flanges.

10. In a telephone directory holder, in combination:

retractable means for suspending a directory by its binding edge in a recess beneath a horizontal shelf whereby the forward edge of said directory is relatively exposed, and for guidably withdrawing said directory to a reading position at a forward edge of said shelf where when opened said directory rests at a substantial angle to the horizontal with the pages thereof substantially perpendicular to the user's line-of-sight; and a compliant cover for mounting said directory and for enclosing said forward edge, comprising a binding edge and two sides, each said side including a flange for covering a portion of said exposed edge, and a flexible magnetic strip affixed to each opposing edge of each said flange;

whereby when said directory is released from said reading position, said retractable means guidably returns said directory by force of gravity to said recess and concurrently said cover closes thereby bringing together said flanges whereupon the magnetic attraction of said strips effects a sealed closure.

11. A telephone directory holder in accordance with claim 10 wherein said compliant cover further includes a pair of narrow, continuous, parallel portions of reduced cross section, each defining a boundary between said binding edge and a respective one of said sides and each serving as a flexible self-hinge for said cover.

12. A directory holder in accordance with claim 11 wherein said sides and flanges extend substantially below the lowermost edge of said directory thereby to lend added protection thereto and further to afford an inlet for dry air to facilitate drying of said directory after prolonged periods of high humidity.

13. Apparatus in accordance with claim 12 wherein said cover further includes a lip extending from said binding edge out over said flanges thereby to direct moisture accumulations away from said closure; and said extended portions of each said flange are curled inwardly at the bottoms to form a handle with which to grasp said directory for withdrawal thereof from said recess.

14. A directory holder in accordance with claim 13 wherein said retractable means comprises an inclined track mounted on the underside of said shelf, a carriage movable between a front and a rear station on said track and having a pivot pin, means for mounting said directory cover by the binding edge thereof to said pivot pin so that said binding edge is substantially horizontal when in said storage position; whereby said carriage is moved manually by said handle from said rear station upward to said front station and said cover thereupon is pivoted upwardly more than 90 degrees until said binding edge impinges upon said forward edge of said shelf.

15. Apparatus for mounting a telephone directory in a storage position beneath a shelf and for withdrawing said directory to a reading position upon said shelf comprising, in combination: an inclined track mounted on the underside of said shelf; a carriage movable between a front and a rear station on said track; a unitary cover comprising a binding edge, a pair of sides, each side being self-hinged to said binding edge, and a pair of opposed flanges, each attached to a respective one of said sides, each said flange having continuous flexible magnetic strips of barium ferrite rubber or the like mounted along an opposing edge thereof for effecting a sealed closure of said flanges; and pivotal means mounted on said carriage for suspending said cover by said binding edge; whereby said carriage is withdrawn manually from said rear station upwardly along said inclined track to said front station whereby said cover is pivoted upwardly more than 90 degrees to a reading position wherein said binding edge impinges upon the forward edge of said shelf; and when said directory is released said cover pivots downwardly and said sides approach closure whereupon said magnetic strips of said edges are mutually attracted to effect said sealed closure of said flanges.

References Cited by the Examiner

UNITED STATES PATENTS

| | | | |
|---|---|---|---|
| 1,796,496 | 3/1931 | Volkmar | 312—233 |
| 1,838,489 | 12/1931 | Kirshner | 63—2 |
| 2,494,382 | 1/1950 | Faulkner et al. | 312—233 |
| 2,841,152 | 7/1958 | Popper | 129—38 |
| 2,959,832 | 11/1960 | Baermann | 24—201 |
| 3,028,701 | 4/1962 | Popper | 248—447 |
| 3,152,716 | 10/1964 | Feldhahn | 220—31 |

CLAUDE A. LE ROY, *Primary Examiner.*

J. F. FOSS, *Assistant Examiner.*